United States Patent Office 2,733,260
Patented Jan. 31, 1956

2,733,260

ALPHA-CYANOTHIOAMIDES

Edward G. Howard, Jr., Wilmington, Del., assignor to E. I. du Pont de Nemours and Company, Wilmington, Del., a corporation of Delaware No Drawing. Application October 16, 1952,
Serial No. 315,204

3 Claims. (Cl. 260—465.5)

This invention relates to a new class of chemical compounds and to their preparation. More particularly this invention relates to a new class of cyanothioamides having highly useful properties and to their preparation.

Although cyanothioformamide has been prepared, no alpha-cyanothioamide has heretofore been known. Jander et al., Wein Chem. Ztg. 46, 49–71 (1943) report the preparation of cyanothioformamide from dicyanogen and liquid hydrogen sulfide. However, Lehr et al., Helv. chim. acta 27, 970 (1944) report that malononitrile when reacted with hydrogen sulfide goes easily and directly only to dithiomalonamide. As one goes up the contiguous series of polymethylenedinitriles the same reactions are reported to give dithioamides. See, for instance, U. S. Patent 2,280,578.

Thus, the prior art teaches that the homologous members of the polymethylenedinitrile family, other than the first member, react readily and easily with hydrogen sulfide to form directly the corresponding dithioamide. As is true of practically all known homologous series in organic chemistry, it appeared that the first member of the series exhibited quite different reaction properties than following members of the same series.

It is an object of this invention to provide a new class of cyanothioamides and a method for their preparation. A further object is to provide new cyanothioamides which are highly useful chemical intermediates for the synthesis of other compounds. Another object is to provide new cyanothioamides which have effective insecticidal and fungicidal activity. A still further object is to provide new cyanothioamides which are quite stable, particularly to water and to mild aqueous alkali which are known to decompose readily the first member of the series, cyanothioformamide. Other objects will appear hereinafter.

These and other objects of this invention are accomplished by providing the new class of alpha-cyanothioamides having the structural formula:

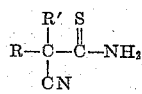

wherein R and R', which can be alike or different, can be hydrogen or lower monovalent saturated aliphatic hydrocarbon radicals and the total of carbons in R and R' cannot exceed four. Thus, R and R' can be hydrogen or lower alkyl radicals of 1 to 4 carbon atoms, that is methyl, ethyl, propyl or butyl, with the sum of the carbon atoms in both R and R' not being greater than four. The new alpha-cyanothioamides of this invention, in addition to cyanothioacetamide, include alpha-substituted cyanothioacetamides, i. e. alpha-monosubstituted and alpha,alpha-disubstituted monothioamides of the corresponding malononitriles.

It has now been discovered that malononitrile and substituted malononitriles wherein the total number of carbons in the substituents on the alpha-carbon is not greater than four, in reaction with hydrogen sulfide under the conditions herein set forth, form the monothioamide. The new cyano-substituted monothioamides can be readily prepared by the direct action between the corresponding dinitrile and hydrogen sulfide, preferably in essential stoichiometric quantities. The reaction is carried out at temperatures in the range of 0–100° C. and preferably in the range of 0–50° C. Lower temperatures, e. g., −10° to −20° C. or even as low as −60° C., i. e., with liquid hydrogen sulfide, can also be used but the reaction proceeds more slowly and such conditions are accordingly not preferred.

For convenience and greater reaction efficiency, primarily due to better contact between hydrogen sulfide and the dinitrile since hydrogen sulfide is most conveniently used in gaseous form, the reaction is preferably carried out in the presence of an inert, liquid organic diluent which is non-reactive with the dinitrile, the thioamide, or hydrogen sulfide. Most preferably the liquid organic diluent is a non-solvent for the cyano-substituted monothioamides formed. Suitable classes of these non-reactive liquid organic diluents include the halogenated hydrocarbons, such as chloroform, carbon tetrachloride, and the like; the aromatic hydrocarbons such as benzene, toluene, the xylenes, chlorobenzene, and the like; the higher simple aliphatic alcohols such as butyl, amyl, isoamyl alcohols, and the like; the liquid hydrocarbon ethers, preferably the monoethers such as diethyl ether, dibutyl ether, and the like. In the lower temperature ranges, e. g., 0–25° C., the lower aliphatic alcohols, e. g., methyl, ethyl, or propyl alcohols can also be used.

The reaction is preferably carried out in the presence of any strong organic base as a catalyst which is preferably soluble in the liquid organic diluent used. The base may be used in amounts ranging from as little as 0.01 to as much as 25 mole percent based on the dinitrile used. Since a cleaner product is obtained thereby, the strong organic base is preferably removed from the reaction mixture as soon as the reaction is carried to completion. Suitable examples of these strong organic bases include the tertiary-hydrocarbon amines, particularly the tertiary aliphatic amines such as triethylamine, the hydroxy-substituted primary, secondary or tertiary amines, such as ethanolamine, triethanolamine, and the like. However, other similar strong organic soluble bases can be used.

The starting dinitriles may be alternatively regarded as alpha-cyano-substituted acetonitriles or as alpha-substituted malononitriles. Suitable specific examples of the necessary dinitrile intermediates include those having no hydrogen on the alpha-carbon, e. g., alpha,alpha-dimethylmalononitrile, alpha,alpha-diethylmalononitrile, and the like, and those having at least one hydrogen on the alpha-carbon, e. g., alpha-butylmalononitrile, alpha-methylmalononitrile, and the like. From these intermediates using the foregoing reaction conditions, and more particularly those given in greater detail in the example following, there will be obtained the corresponding monothioamides, i. e., respectively, alpha-cyano - alpha - methylthiopropionamide, alpha - cyano-alpha - ethyl - thiobutyramide, alpha - cyanothiohexano-amide, and alpha-cyanothiopropionamide. Because of their greater utility as intermediates, for instance, in the formation of 4-cyano-5-thio-2,3-dioxopyrrolidines by reaction with oxalate esters, the preferred members of this new class of alpha-cyano-substituted-thioacetamides are those carrying at least one hydrogen on the said alpha-carbon. Cyanothioacetamide, i. e., the member of the series carrying two hydrogens on the alpha-carbon is the most outstanding of these new compounds for the same reasons.

The following examples in which the parts given are by weight are submitted to further illustrate the preparation of this new class of cyano-substituted thioacetamides and the important use of certain of them as intermediates in the formation of 4-cyano-5-thio-2,3-dioxopyrrolidines. It is to be noted that neither the dithioamides or even the first member of the monothioamide family, cyanothioformamide, are structurally capable of undergoing this pyrrolidine-forming reaction.

EXAMPLE I

*Part A.—Preparation of cyanothioacetamide*

In a reactor protected from atmospheric moisture with drying tubes and fitted with a gas inlet tube and a mechanical stirrer, was placed a solution of 66 parts of malononitrile in about 160 parts of absolute ethanol containing 15 parts of triethanolamine and hydrogen sulfide gas bubbled into the solution at room temperature. Passage of the gas was continued until no more yellow solid formed, at which point the reaction temperature had reached 42° C. The reaction mixture was then cooled to 0° C. and the solid product removed by filtration. There was thus obtained 77 parts (77% of theory) of crude cyanothioacetamide melting at 108–110° C. After recrystallization from absolute ethanol, there was obtained pure cyanothioacetamide as colorless needles melting at 121–123° C. with softening at 119° C.

*Anal.*—Calc'd for $C_3H_4N_2S$: N, 27.98%; S, 32.01%. Found: N, 27.89%; S, 32.03%.

*Part B.—Preparation of the monosodium salt and the monohydrate of 4-cyano-5-thio-2,3-dioxopyrrolidine*

To a stirred absolute ethanol solution of sodium ethoxide (20.2 parts of sodium in about 315 parts of absolute ethanol) was added at room temperature 44 parts of the above crystalline cyanothioacetamide (0.50 molar proportion based on the sodium ethoxide) and 68.6 parts of diethyl oxalate (1.07 molar proportions based on the cyanothioacetamide). The reaction mixture solidified in approximately one minute and about 400 parts of absolute ethanol was added to facilitate stirring. The solid crystalline material was removed from the reaction mixture by filtration and after drying, there was thus obtained 55.5 parts (71.5% of theory) of the crude monosodium salt of 4-cyano-5-thio-2,3-dioxopyrrolidine as a brown amorphous powder. A portion of the product was dissolved in a large quantity of hot absolute methanol and anhydrous diethyl ether added slowly to the cloud point, i. e., until precipitation was just initiated. The still warm, mixed solvent solution was then allowed to cool to room temperature and the resulting crystalline product removed by filtration and dried. There was thus obtained the monosodium salt of 4-cyano-5-thio-2,3-dioxopyrrolidine as golden brown platelets readily soluble in water and melting at 243–246° C. with decomposition and charring. A water solution of the sodium salt with ferric chloride solution exhibited a deep red to purple coloration and with an aqueous copper sulfate solution formed a precipitate of the copper salt as a green-black amorphous solid.

To a solution of two parts of the above monosodium salt in 20 parts of water was added dropwise with cooling aqueous 5% hydrochloric acid until precipitation was complete. The golden crystalline solid was removed by filtration and rapidly recrystallized from hot water. After drying at 65° C. there was thus obtained one part of the monohydrate of 4-cyano-5-thio-2,3-dioxopyrrolidine as golden platelets melting at 240–250° C. with decomposition.

*Anal.*—Calc'd for $C_5H_2N_2O_2S \cdot H_2O$: N, 16.25%; S, 18.62%. Found: N, 16.34%; S, 18.85%.

A water solution of the monohydrate exhibited a deep red to purple coloration with ferric chloride solution and formed colored precipitates with aqueous solutions of heavy metal ions, e. g., green-black with $Cu^{++}$, deep red turning to black with $Ag^+$, light yellow with $Hg^{++}$, and deep yellow with $Pb^{++}$.

The new cyanothioacetamides of this invention are highly useful chemical intermediates for the synthesis of other compounds. In themselves they exhibit surprising and effective insecticidal and fungicidal activity and are quite stable, particularly to water and mild aqueous alkali which are known to decompose readily the first member of the series, cyanothioformamide.

These new cyanothioacetamides are efficient and non-toxic fungicides in combatting such plant diseases as bean rust and early and late tomato blight, especially the latter, more effectively than such commercially available materials as tetra copper calcium oxychloride. For instance, when 0.2% (by weight) aqueous sprays of cyanothioacetamide were applied to tomato plants, only 18% of the plants so treated exhibited early blight and only 2% exhibited late blight; whereas, 100% of the control plant series were heavily infected with both diseases. Similarly, only 17% of a series of tomato plants sprayed with 0.04% aqueous solutions of cyanothioacetamide exhibited late tomato blight; whereas, 100% of the control plant series were heavily infected. In like manner, aqueous 0.2% sprays of cyanothioacetamide controlled bean rust in bean plants to the extent that only 44% of the plants in the treated series exhibited the disease; whereas, all of the plants in the control series were heavily infected.

As many apparently widely different embodiments of this invention may be made without departing from the spirit and scope thereof, it is to be understood that this invention is not limited to the specific embodiments thereof except as defined in the appended claims.

I claim:

1. An alpha-cyanothioamide having the structural formula

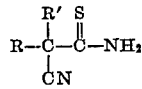

wherein R and R' are members selected from the class consisting of hydrogen and lower alkyl radicals and the sum of the carbon atoms in R and R' is not greater than four.

2. The chemical compound, cyanothioacetamide.

3. An alpha-cyanothioamide having the structural formula

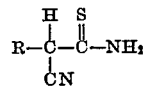

wherein R is a lower alkyl radical of not more than four carbon atoms.

References Cited in the file of this patent

UNITED STATES PATENTS

| | | |
|---|---|---|
| 2,166,120 | Bousquet | July 18, 1939 |
| 2,201,172 | Hanford | May 21, 1940 |
| 2,678,315 | Frederick | May 11, 1954 |

OTHER REFERENCES

Gay-Lussac: Beilstein (Handbuch, 4th ed.), vol. II, p. 564 (1920).